Patented Mar. 8, 1949

2,463,952

UNITED STATES PATENT OFFICE 2,463,952

CORK COMPOSITION AND PROCESSES FOR THEIR PREPARATION

Giles B. Cooke, Baltimore, Md., assignor to Crown Cork & Seal Company, Inc., Baltimore, Md., a corporation of New York No Drawing. Application October 27, 1944, Serial No. 560,724

2 Claims. (Cl. 117—100)

The invention relates to cork compositions and to the processes for their preparation, and more particularly, to granulated cork compositions and plasticized vinyl ester resinous binder therefor.

Granulated cork which is bound together to form a united structure is employed in the formation of a large number of articles of commerce, such as, for example, inner liners for bottle caps, container closures, and the like. Various materials have been employed as the binding agent to combine the cork particles into a unitary structure. However, all of the binders employed heretofore possessed certain innate characteristics which, although they permit commercially usable structures to be formed, nevertheless leave much to be desired. Thus, for most applications, the cork used in the indicated structures must be softened or plasticized in order to give a sufficient amount of flexibility to the final composition. Furthermore, most resinous binders require modification with plasticizers in order that the resulting cork-binder composition will possess suitable flexibility. One of the binders which has been most widely employed heretofore, is that known as phenolic or phenolformaldehyde type of resins. However, these particular binders possess the undesirable characteristic that the plasticizers therein exude or sweat-out from the resin. Consequently, as the cork composition ages, its flexibility and utility decrease. Various other binders which have been employed heretofore may possess the deficiency noted for the phenolic resin binders and/or be incapable of withstanding some of the materials and the reagents with which the cork structures come into contact during use and/or may possess undesirable odor and taste characteristics.

As noted above, most uses for the indicated cork compositions require that the cork comprising them be plasticized or softened. Moreover, it is desirable that the degree of softness or plasticization of the cork be maintained within certain specific limits in order that the flexibility of the final structure may adequately meet the specifications required for the particular use in which the composition or structure is to be employed. Hence, it is desirable that the binder employed in the formation of these cork structures be of such a nature as to permit the plasticizer content of the cork to be substantially unaffected.

The principal object of the present invention is the provision of new and useful cork compositions. A further object is the provision of cork compositions comprising finely divided or granulated cork containing a plasticizer, both the resinous binder and its plasticizer being inert with respect to the cork and the cork plasticizer. A still further object is the provision of cork structures comprising granulated and plasticized cork and a plasticized resinous binder which is substantially inert towards all reagents with which it comes into contact during use and which maintains its degree of flexibility substantially constant throughout its lifetime. Another object is the provision of a granulated cork composition which may be stored or kept indefinitely without injury to the binder. Further objects are the provision of granulated cork compositions which may be formed into suitable structures by the subjection of the compositions to heat and pressure, and which are entirely free of odor or taste characteristics and exhibit a desirable degree of acid resistance. Further objects will become apparent from the description of the invention given hereinafter.

These objects are accomplished according to the present invention wherein granulated or finely divided cork is first plasticized with a suitable cork plasticizer and is then coated with a plasticized vinyl ester resinous binder by admixing the plasticized granulated cork with an aqueous dispersion of the resinous binder and its plasticizer. This admixture is thereafter subjected to conditions whereby the volatile constituents of the admixture are volatilized and a free-flowing composition of cork coated with plasticized vinyl ester resin is obtained wherein the cork plasticizer and the resinous binder plasticizer are dissimilar, non-reactive, and substantially immiscible, and the resinous binder is substantially inert toward and immiscible with the cork and its plasticizer.

Broadly, these granulated cork compositions and structures thereof are prepared by the following procedure. The granulated or finely divided cork is admixed with a suitable quantity of cork plasticizer for a sufficient length of time and under suitable conditions to distribute the cork plasticizer evenly throughout the cork. To this plasticized cork is then added an aqueous dispersion of a vinyl ester resin and resin plasticizer, and the entire mass sufficiently well mixed to insure thorough distribution of the resin dispersion upon the cork. This cork and resinous binder mass is then subjected to suitable conditions whereby the volatile constituents of the mass are vaporized and final free-flowing product consisting of plasticized granulated cork coated with the plasticized vinyl ester binder is obtained. These granular cork compositions are then formed into suitable united structures in any of the conventional methods well known to the art. Thus, these compositions may be charged into suitable molds and subjected to heat and pressure whereby the desirable structures are formed. Prior to the molding operation, the cork compositions are advantageously mixed with any known mold lubricant.

The vinyl ester resin dispersion employed in the formation of these cork compositions is preferably prepared by separately forming an aqueous dispersion of the resin plasticizer with the aid of suitable emulsifying agents and an aqueous dispersion of the vinyl ester resin, and then admixing the two dispersions. In this operation, it is desirable that the pH of the final dispersion mixture be about 9 or only slightly higher in order that no appreciable coagulation of the dispersion will take place when the cork is coated with the same.

The exact ratio of the disperse phase to dispersion phase in the final mixtures of these aqueous resinous binder dispersions may depend upon the particular ingredients involved and upon the particular equipment and process which is employed in coating the plasticized granulated cork with the same. However, it has been found preferable for most applications that this ratio be between about 2 to 5 and 3 to 5.

The vinyl ester resins for use in this invention are those prepared by the polymerization of monomeric vinyl esters, such as vinyl chloride and vinyl acetate or by the copolymerization of these monomers with one another. This polymerization may be conducted according to any of the methods well known to the art, but since the resins are ultimately to be employed in this invention as aqueous dispersions, it is preferable that the monomers be polymerized by the so-called dispersion or emulsion process and obtained as aqueous dispersions.

Any suitable plasticizer for vinyl ester resins which is substantially immiscible with the cork plasticizer and inert toward the cork may be employed for the formation of the resinous binder. Thus, such plasticizers as butyl phthalyl butyl glycollate, dibutyl phthalate, dioctyl phthalate, dibutyl sebacate or other high boiling organic esters may be satisfactorily employed. The exact concentration of the plasticizer in the composition will depend in part upon the ultimate use to which the final structure is to be placed, upon the degree of flexibility required of the composition, and upon the physical characteristics of the resinous binder. However, it has been found preferable that the resin plasticizer concentration of the final cork composition should be maintained between about 50 and 60% by weight of the weight of the resin binder in the composition where the cork compositions are to be employed in the formation of container closures.

Various plasticizers or softeners may be employed to impart the desired flexibility to the cork of these compositions. Glycerine is the preferred material for this purpose, but other polyhydroxy alkanes, such as propylene glycol, may also be employed. In the manufacture of compositions that are not to be used for sealing foods and beverages, ethylene glycol or diethylene glycol, may be employed as the plasticizer in lieu of the preferred glycerine. The exact quantity of cork plasticizer to be employed will depend, to some extent, on the desired flexibility in the final product and in turn upon the particular resin employed as a binder and the quantity of plasticizer used in the preparation of this resin binder. However, in the preferred use of these cork compositions, it has been found preferable that the quantity of cork plasticizer shall be between about 10% and 15% by weight of the cork.

Emulsifying agents which are stable in alkaline media may be employed in the formation of the aqueous dispersions of the vinyl ester binders of this invention. Thus, such emulsifying agents as alkanolamines, alkaline caseinates, salts of sulfonated aromatic or aliphatic hydrocarbons, or other similar emulsifying agents which are effective in alkaline media may be utilized. The exact concentration of the emulsifying agent employed in the formation of the resin binder dispersion is dependent to a certain extent upon the ratio of dispersed phase to dispersion phase in the disperse system and upon the exact ingredients comprising the dispersion, but for most purposes it has been found preferable that the concentration of the emulsifying agent should be between about 1% and 5% by weight of the total dispersion.

The present cork compositions may be modified by the incorporation of dyes, bleaching agents, pigments, fillers and the like. These modifiers may be incorporated in the compositions by admixture with the cork during the plasticization of the same or they may be incorporated in the aqueous dispersion of the resinous binder. Certain of the modifying ingredients are most advantageously incorporated by their addition to one of the components than to the other component. Thus, when a bleaching agent, such as oxalic acid is used, it is advantageously admixed with the cork structure after the plasticized cork has been coated with the resinous binder. On the other hand, the incorporation of pigments is most advantageously accomplished by the addition of these materials to the resinous binder dispersions prior to their admixture with the cork. The incorporation of molding lubricants, such as ceresin wax, paraffin wax and the like, is best accomplished after the binder has been, at least partially, mixed with the granulated cork.

After the resinous binder and plasticized cork have been thoroughly admixed and before the cork compositions are charged into molds for mounting, it is desirable that the volatile constituents in the cork mass be removed. This can be done in any of the ways known to the art for the drying of finely divided or granulated bodies, e. g., by conveying the coated cork granules through a rotary dryer employing hot air as the drying medium.

The process and compositions of the present invention are illustrated by the following specific examples, in which all parts are by weight unless otherwise specified.

Example 1

This example illustrates the formation of plasticized cork granules.

The following ingredients:  Parts
Granulated cork _____ 180
Glycerine _____ 25 are charged into a suitable mixing apparatus. These ingredients are then subjected to mixing for a sufficient length of time to evenly and thoroughly coat the cork granules with the plasticizer. The plasticized cork particles thus produced are suitable for admixture with the vinyl ester resin binder for the preparation of the cork composition of this invention.

Example 2

This example illustrates the production of an aqueous dispersion of a vinyl ester resinous binder.

The following solutions are prepared by admixture of the indicated ingredients for a sufficient length of time to insure complete solution:

Solution A:                                     Parts
  Water _____ 195
  Triethanolamine _____   3
  25% casein solution made alkaline with
    ammonia _____   3

Solution B:
  Butyl phthalyl butyl glycollate _____ 200
  Oleic acid _____   4

The solutions A and B are then admixed with sufficient agitation to disperse solution B homogeneously throughout solution A and form a stable emulsion. This emulsion may be referred to as the resin plasticizer emulsion, since the butyl phthalyl butyl glycollate contained in this emulsion is the plasticizer for the resinous binder of this example.

The pH of this plasticizer emulsion is then adjusted to a value of 9 or 10 but not appreciably higher than 10, by the addition of further ammonia if necessary. 125 parts of the plasticizer emulsion with its pH adjusted as indicated, are then added streamwise to 215 parts of an aqueous polyvinyl chloride emulsion containing 52% by weight of solids and possessing a pH of 9. Simultaneously with the addition of the plasticizer emulsion and the polyvinyl chloride emulsion, 25 parts of a 25% casein solution are added streamwise and proportionately with the plasticizer emulsion. The materials are subjected to vigorous agitation throughout the course of their admixture. A stable aqueous dispersion of the polyvinyl chloride resin and plasticizer results which may then be employed to coat suitably plasticized granulated cork, such as that prepared as indicated in Example 1.

In another case, the 25 parts of casein solution were first mixed with the plasticizer emulsion and this mixture was then mixed as indicated with the polyvinyl chloride emulsion. A stable aqueous dispersion identical to that produced in the previous case results.

Example 3

This illustrates the preparation of plasticized granulated cork coated with a plasticized vinyl ester resinous binder.

180 parts of the granulated cork, as prepared in Example 1, are charged into a suitable mixing vessel, to which is added 300 parts of the resin binder emulsion as produced in Example 2. The two ingredients are then subjected to mixing for a sufficient length of time so as to thoroughly and evenly coat the plasticized granulated cork with the resinous binder. Thereafter, 30 parts of a 10% aqueous solution of oxalic acid is incorporated in the mixture. Finally, 5 parts ceresin wax are thoroughly admixed with the cork composition in the mixer. Finally, the resulting cork composition is freed of all volatile constituents by subjecting the same to a drying operation in a rotary drier employing hot air as the drying medium.

A free flowing cork composition results which is composed of granulated cork plasticized to a controlled degree and which is coated with a plasticized resinous binder. The resinous binder and its plasticizer are substantially inert toward the cork and its plasticizer. As a consequence, the cork product of this example maintains its physical characteristic, such as flexibility, over an indefinite period of time. Moreover, this cork product is free from odor and is highly resistant to mildly acidic reagents.

Example 4

This example illustrates the preparation of a united structure of the granulated cork compositions of this invention.

A sufficient quantity of the cork composition of Example 3 is charged into a cylindrical mold 1" in diameter and 24" in length by application of sufficient pressure thereto to form a structure of the density desired. The composition is then subjected for 70 minutes to a temperature of 265° F. A compact rod of granulated cork 1" in diameter and 24" in length is obtained. This rod may then be sliced by conventional methods to produce inner liners for bottle caps and the like. The resulting bottle caps exhibit a satisfactory resistance to the action of boiling water, to mildly acidic reagents, and are completely free from odor. Furthermore, they maintain their characteristic physical properties, such as flexibility, over an indefinite period of time.

If the molding procedure indicated above is conducted at a temperature appreciably below 265° F., the resulting cork structure does not possess a satisfactory resistance to the action of boiling water.

The process of this invention produces new and useful granulated cork compositions comprising plasticized cork and a plasticized resinous binder wherein the plasticizers of the cork and the resinous binder are dissimilar and inert towards one another and the resinous binder is inert relative to the cork and its plasticizer. These cork compositions exhibit greater stability of physical characteristics than similar cork compositions known heretofore. Likewise, these compositions are odorless, tasteless, and they possess relatively high degrees of resistance toward mildly acidic reagents. These cork compositions may be employed in all applications for which similar granulated cork compositions are known to be useful, though, in particular, they are outstandingly useful in the preparation of inner liners for bottle caps and container closures.

Since many and varied modifications of the present invention will be apparent to those skilled in the art, this invention is not to be limited to the specific embodiments or features noted herein, except as set forth by the following claims.

I claim:

1. A process for forming granulated cork composition which comprises the steps of uniformly mixing and thereby plasticizing each of the cork granules with a liquid cork plasticizer selected from the group consisting of glycerine, propylene glycol, ethylene glycol and di-ethylene glycol, thereafter uniformly admixing and coating each of the plasticized granules with an aqueous dispersion of a vinyl ester resin selected from the group consisting of vinyl chloride, vinyl acetate and the copolymerization product of vinyl chloride and vinyl acetate and a compatible plasticizer therefor comprising a high-boiling saturated organic ester of a saturated carboxylic acid, said plasticizer being substantially immiscible with the plasticizer of the cork and possessing no plasticizing action upon the cork, and finally removing the volatile constituents from the resulting mass.

2. The product prepared by the process of claim 1.

GILES B. COOKE.

REFERENCES CITED

The following references are of record in the file of this patent:

UNITED STATES PATENTS

| Number | Name | Date |
|---|---|---|
| 903,865 | Jones | Nov. 17, 1908 |
| 2,121,791 | Frink | June 28, 1938 |
| 2,188,396 | Semon | Jan. 30, 1940 |
| 2,317,328 | Kinney | Apr. 30, 1943 |
| 2,377,402 | Cooke et al. | June 5, 1945 |

FOREIGN PATENTS

| Number | Country | Date |
|---|---|---|
| 816,053 | France | Apr. 19, 1937 |
| 557,230 | Great Britain | Nov. 11, 1943 |

OTHER REFERENCES

Polyvinyl Acetate, Properties and Application of Emulsions, Solids, Solutions—R. & H. Chemicals Dept. E. I. Du Pont de Nemours & Co., Inc., March 1941.

Technical Bulletin No. A-2446—Electrochemicals Dept. E. I. Du Pont de Nemours & Co., Inc., May 1944.